United States Patent [19]

Kaliski

[11] Patent Number: 5,116,418
[45] Date of Patent: May 26, 1992

[54] PROCESS FOR MAKING STRUCTURAL AGGREGATE PIGMENTS

[75] Inventor: Adam F. Kaliski, East Windsor, N.J.

[73] Assignee: Industrial Progress Incorporated, East Windsor, N.J.

[21] Appl. No.: 420,388

[22] Filed: Oct. 12, 1989

Related U.S. Application Data

[60] Continuation of Ser. No. 341,791, Apr. 21, 1989, abandoned, which is a continuation of Ser. No. 158,871, Feb. 22, 1988, abandoned, which is a continuation of Ser. No. 96,391, Sep. 14, 1987, abandoned, which is a division of Ser. No. 926,011, Oct. 31, 1986, abandoned, which is a continuation of Ser. No. 677,391, Dec. 3, 1984, abandoned.

[51] Int. Cl.$^5$ ............................................. C04B 14/00
[52] U.S. Cl. .................................... 106/419; 106/423
[58] Field of Search ................................ 106/446, 419

[56] References Cited

U.S. PATENT DOCUMENTS

| | | | |
|---|---|---|---|
| 2,974,108 | 3/1961 | Alexander | 252/313 |
| 3,002,932 | 10/1961 | Duwell et al. | 252/179 |
| 3,515,566 | 6/1967 | Moody et al. | 106/300 |
| 3,726,700 | 4/1973 | Wildt | 106/300 |
| 3,897,261 | 7/1975 | Allen | 106/300 |
| 4,247,420 | 1/1981 | Dumoulin et al. | 252/453 |
| 4,329,328 | 5/1982 | McAnespie et al. | 423/333 |
| 4,816,074 | 3/1989 | Raythatha | 106/468 |
| 4,927,498 | 3/1990 | Rushmere | 162/168.3 |

*Primary Examiner*—William R. Dixon, Jr.
*Assistant Examiner*—Alan Wright
*Attorney, Agent, or Firm*—Sachs & Sachs

[57] ABSTRACT

Process for manufacturing of structural aggregate pigment products with intrinsically built-in functional properties, from aqueous dispersions of particulate matter treated with in-situ formed complex functional microgels with rapid formation kinetics.

22 Claims, No Drawings

PROCESS FOR MAKING STRUCTURAL AGGREGATE PIGMENTS

This case is a continuation of U.S. Ser. No. 07/341,791 filed Apr. 21, 1989, now abandoned which in turn is a continuation of U.S Ser. No. 07/158,871 filed Feb. 22, 1988, now abandoned, which in turn is a continuation of U.S. Ser. No. 07/096,391 filed Sept. 14, 1987, now abandoned, which in turn is a divisional of U.S. Ser. No. 06/926,011 filed Oct. 31, 1986, now abandoned, which in turn is a continuation of U.S. Ser. No. 06/677,391 filed Dec. 3, 1984, now abandoned.

BACKGROUND OF THE INVENTION

1. Field of the Invention

This invention relates to complex (multi-component) functional microgels synthesized in the presence of a foreign, quantitatively predominant, particulate matter which is essentially non-reactive therewith.

Specifically, this invention relates to a process for the manufacture of novel structural aggregate pigment products from particulate matter treated with complex functional microgels.

The complex functional microgels employed, characterized by instantaneous (ultrarapid) formation kinetics, are synthesized in situ from subcolloidal reactive silico-aluminate and similar hydrosols and bivalent and multivalent inorganic salts and/or organic, cationically active, chemical compounds with at least two reactive groups in each molecule.

2. Discussion of the Relevant Art

The scope of prior art relating to the synthesis and practical applications both of continuous and discrete gels obtained by interaction of alkali-metal silicates with sodium aluminate, soluble metal salts and/or free acids in different proportions and combinations is simply enormous, involving many thousands of patented gel products.

Most of these products differ from each other only in minor details, such as pH conditions, reagent concentrations, sequence of reagent additions, thermal regimes or particular variations in the otherwise very similar preparation procedures. Yet, these seemingly minor differences may bring about improved, or even novel, material or performance properties of the resultant end products, whose applications encompass such different fields as catalysis, pharmaceuticals, adhesives, water treatment, ion exchange, dehumidification of gases or soil conditioning.

The above can probably be comprehended best by considering that colloids are the lowest-rank systems known in nature equipped with "memory." As such, they "remember" their history in chronological detail and react accordingly in terms of their resultant properties and functional behavior. As a consequence, any intentional or accidental deviation from an established synthesis procedure or reaction conditions will inescapably cause certain differences, mostly quantitative but sometimes profoundly qualitative, in the constitution and/or functional properties of the resultant colloidal systems.

In the following, certain general fields of manufacture and utilization of various types of gels shall be discussed in some detail using examples found in the literature. While continuous single and mixed gels (mechanical blends of two or more separate gels) are inherently foreign to the principal idea of the present invention, they will be included in the general discussion for the sake of better clarity.

In-situ formation of silica or silico-aluminate gels in aqueous media for the purpose of surface coating of mineral particles has been utilized commercially for many years. For example, virtually all titanium dioxide pigments on the market are coated with a more or less dense layer of silica, or silico-aluminate, gels deposited in situ by a controlled interaction between relatively highly concentrated solutions of sodium silicate and appropriate gel-setting agents such as sulfuric or hydrochloric acids, ammonium sulfate, alum or sodium aluminate, in aqueous dispersions of the pigment. However, the surface coatings mentioned represent continuous gels which are fundamentally different from the instantaneously in-situ formed microparticulate gels (microgels) used in practicing the present invention developed by the Applicant and disclosed in co-pending patent application (Ser. No. 07/350,468; Filed May 11, 1989). Moreover, because of the slow formation kinetics and continuous structure of gels used in surface coating of titanium dioxide pigments in accordance with the present art, excessive uncontrollable cementation of individual particles into very abrasive oversized aggregates can not be avoided This particle aggregation is by far the most undesirable side effect of surface coating with continuous gels, having as a rule strongly pronounced cementing properties, since too close a proximity of individual titanium dioxide particles is most detrimental to their light-scattering efficacy. As a consequence, expensive fluid-energy comminution, and/or cumbersome ball milling, must be additionally employed.

U.S. Pat. No. 3,726,000 to Wildt, relating to the use of in-situ formed continuous alumino-silicate gels as intrinsic cements toward the preparation of composite pigments, may be considered as typical of the general prior art in this area of technology dating back for over half a century. Many other intrinsic cementing media have also been used for the same purpose, e g., sodium silicate and aluminum chloride in U.S. Pat. No. 2,176,876 to Alessandroni, aliphatic acid in U.S. Pat. No. 3,453,131 to Fadher, ethylenediamine and citric acid in U.S. Pat. No. 4,075,030 to Bundy, urea-formaldehyde in U.S. Pat. No. 4,346,178 to Economou, or silicon tetrachloride in WO 87/00544 to Jones.

Wildt's composite pigments were intended for latex-paint applications in which the resultant excessive aggregate hardness (abrasiveness), restricting or even prohibiting the use of these pigments in paper filling and coating, does not constitute a real disadvantage. Principal gel compositions and experimental procedures for in-situ formation of continuous gel cements disclosed in the patent to Wildt, are identical to those utilized commercially for many decades toward surface coating of titanium dioxide pigments mentioned previously It should be pointed out in this context that while a certain controlled level of residual particle cementation (permanent aggregation) is quite essential to synthesis of composite pigments, any permanent aggregation is totally undesirable when continuous gels are used for surface coating of titanium dioxide pigments. Unfortunately, all procedures of the present art relying on the use of continuous gels toward pigment aggregation or surface coating are lacking inherent mechanism allowing one to exercise effective control over the extent, or patterns, of the residual cementation of individual particles.

Continuous gels with particle-immobilizing and cementing functions were synthesized according to Wildt by an interaction between sodium silicate and aluminum sulfate in aqueous dispersions of particulate raw materials used for preparation of composite pigments, using relatively high concentrations of gel forming reagents. The particulate raw materials mentioned consisted of titanium dioxide as the principal optically-active ingredient, as well as coarse-particle-size, very abrasive, calcined clays (Engelhard's Satintone No.1 or No.4) and/or coarse delaminated clay as extenders. The procedure described involved several independent critical processing steps, such as heating of the reaction medium (to speed up the formation of continuous gel), alkaline pH adjustments, and long digestion periods (lasting from 30 to 60 minutes) followed by additional acidic pH adjustments. To convert the resultant reacted, dried, solidified, very hard "cake" into a particulate form suitable for use as composite pigment in latex paints, expensive fluid-energy comminution was again necessary.

The concept of immobilization of individual particles of titanium dioxide pigments and extenders (e.g., calcined clays) relative to each other is unquestionably valid and advantageous for latex paints and other related applications. However, the detrimental fractionation of pigmentary components and selective particle aggregation of $TiO_2/TiO_2$ and extender/extender type can not be avoided in composite pigments prepared in accordance with the patent to Wildt because of the slow kinetics of the flocculation process employed. As a consequence, the resultant configurations of aggregated particles are not conducive to efficient light scattering. This has been indeed verified experimentally, composite pigments made in accordance with procedures set forth in the patent to Wildt having significantly poorer optical performance in paper filling and coating applications than analogous blends of identical titanium dioxide and calcined clay used in loose (non-aggregated) state.

Hoffmann, in U.S. Pat. No. 3,476,692, describes the preparation of a "silicomagnesium-aluminate-hydrate" gel (antacid) for use in treatment of gastric hyperacidity. In particular, the above invention pertains to a silicomagnesium-aluminate-hydrate gel certain properties of which are improved compared to those of other patented antacid products of virtually identical compositions. It should be emphasized rather strongly, however, that the terminology used routinely in colloidal-technological descriptions leaves much to be desired. For example, Hoffmann's so-called silicomagnesium-aluminate-hydrate gel is factually a mechanical blend of separately prepared silico-aluminate gel and a magnesium hydroxide gel, hence, fundamentally different from true complex gels used in practicing the present invention. In specific terms, Hoffmann's antacid gel was prepared by mixing concentrated solutions of sodium silicate and an aluminum salt under alkaline conditions for extended periods of time, e.g., 30 minutes, to form a solidified silico-aluminate cogel. This cogel was subsequently crushed and homogenized into a flowable pulp, into which a concentrated solution of magnesium sulfate was introduced gradually over a period of time lasting 3 hours. As a consequence, the in-situ precipitated magnesium hydroxide hydrate became mechanically, though intimately, dispersed within the previously fluidized pulp of the continuous silico-aluminate cogel.

Inorganic anion-exchangers and a process for their synthesis are disclosed by Duwell in U.S. Pat. No. 3,002,932. The above ion exchangers are prepared by . . . "coprecipitating mixed hydrated oxides of a pair of homolomorphic metals chosen from the group consisting of aluminum, silicon, titanium, zinc, and zirconium, the lower-valent member of said pair being present in major amount, in an aqueous medium at a pH in the range of about pH 5 to 7, drying the aqueous mixture at a temperature below 150° C., and washing the dried mixture with water to remove soluble impurities therefrom." The above technology, as quoted, is based again on physical mixtures of separately formed gels rather than true complex microgels made up of intrinsically chemically bound complex macromolecules U.S. Pat. No. 4,239,615 to Tu is typical of a vast group of patents pertaining to the manufacture and use of zeolites in catalytic cracking of hydrocarbon charges (crude oils). All such zeolite catalysts are based in principle on various modifications and extensions of continuous silico-aluminate cogels described extensively in textbook literature. It is because of the "memory" effects associated with colloidal systems, mentioned previously, that such endless varieties of related gel products with material or functional-performance differences of practically significant magnitudes can be synthesized with the aid of only two principal ingredients, namely, sodium silicate and sodium aluminate (or aluminum sulfate). As documented amply in everyday industrial experience, relatively small differences in the preparation, handling or post-treatment of such gels, the incorporation of various transient or permanent adjuvants notwithstanding, will often result in significant modification of such important product features as abrasion resistance, catalytic activity and selectivity, inhibition resistance or pore-size distribution.

In addition to using silica-alumina cogels as cracking-catalyst precursors, Tu also employed certain specific brand of anionic polyacrylamide (transient adjuvant) to modify the mechanical structure of catalyst matrix. Accordingly, after a subsequent burnout of the organic substance occluded in the latter matrix, Tu was able to obtain a more favorable pore-size distribution. As far as purely chemical functions of the anionic polyacrylamide with regard to catalyst formation are concerned, Tu cautiously offers the following hypothesis proposed also in other similar patents: "it is believed that the anionic form chemically react with the silica-alumina gel framework, rather than being physically dispersed in the gel, and thus contributes to the desired pore structure formation." A well known fact is, however, that concentrated solutions of strongly alkaline reagents used without exceptions in the synthesis of silica-alumina gels for catalyst precursors immediately coagulate virtually all organic water-soluble polymers available commercially, indicated clearly by phase separation. The overwhelming likelihood is, therefore, that the polyacrylamide adjuvant mentioned above was de facto dispersed mechanically in the gel, much in the same way though perhaps not as intimately as the in-situ formed molecularly precipitated magnesium hydroxide hydrate in Hoffmann's silico-aluminate antacid-gel matrix described in U.S. Pat. No. 3,476,692. As far as zeolites' reactivity on a molecular level is concerned, small amounts of metallic cations such as magnesium or calcium ions can be accepted indeed into the zeolite matrix, albeit by reversible ion-exchange mechanism rather than (irreversible) chemical reaction.

Dumoulin in U.S. Pat. No. 4,247,420 and Tu in U.S. Pat. No. 4,239,615, discussed previously, describe the use of auxiliary extraneous disperse phase(s) in the preparation of catalyst precursor gels. These particulate materials, used mainly as diluents or catalyst-matrix modifiers, are selected from among natural or synthetic zeolite powders and/or kaolin clays. Embedded in the continuous gel body, the relative proportion of these auxiliary particulates is restricted as a rule to less than 25% of the total mass of the catalyst.

Kaliski in U.S. Pat. No. 3,484,271 describes the formation of functional (release) coatings on moving paper webs by an in-situ interaction between consecutively applied separate solutions of organic anionic and cationic compounds with at least two functional groups in each molecule. These release coatings are made in the form of continuous, totally impervious, gel films devoid of any particulate occlusions. As a matter of fact, a particulate matter embedded in such films would destroy more or less completely these films' useful release properties.

U.S. Pat. No. 2,974,108 to Alexander discloses synthesis of stable alumino-silicate aquasols (hydrosols) with ion-exchange capacities equivalent to those of better zeolites, and also very good antisoiling properties. These aquasols are prepared with the aid of rather intricate thermal regimes and time-consuming procedures, using silicic acid (rather than straight alkali-metal silicate, or quaternary ammonium silicate, used in practicing the present invention) and sodium aluminate as the principal reagents. According to Alexander, the end product contains preferably from 5% to 20% of substantially spheroidal porous particles suspended in an aqueous medium with pH ranging between 5 and 10, the preferred diameter of aquasol particles ranging from 10 to 50 milimicron (nanometer) and particle porosity from 10% to 70%. Most importantly, however, the aquasols (hydrosols) according to Alexander are end products in themselves and chemically non reactive, whereas the hydrosols used in practicing the present invention are short-lived intermediate products characterized by a high level of chemical reactivity.

Additional comparisons with the prior art will be made hereinafter, wherever applicable It should be noted, however, that in reviewing the existing art Applicant is not aware of any references pertaining to systems that are true complex gels, with all principal molecular constituents being chemically bound within the same complex macromolecules, as differentiated from purely physical mixtures of two or more separate gels. In particular, no references have been found in the literature pertaining to complex, multicomponent, rapidly forming, micro-particulate gels (microgels) used in practicing the present invention or conditions under which these microgels ca be synthesized and/or utilized. More specifically, no references whatsoever were found in the literature regarding the use of complex microgels toward the manufacture of structural aggregate, single-component or multiple-component, pigment products for paper filling and coating, or any other application for that matter.

SUMMARY OF THE INVENTION

Process for the manufacture of single-component and multiple-component structural aggregate pigment products made by a procedure comprising the steps of:

(a) blending separate aqueous solutions of hydrosol-forming reagents, one of which contains alkali-metal, or quaternary ammonium, silicate and the other one of which contains alkali-metal aluminate and/or alkali-metal zincate, with an aqueous dispersion of quantitatively predominant particulate matter, optionally containing water soluble functional adjuvants, to form in situ a subcolloidal reactive (polymeric) hydrosol;

(b) blending an aqueous solution containing at least one bivalent or multivalent inorganic salt and/or organic cationically active chemical compound with two or more reactive groups in each molecule with the system obtained in step (a) to crosslink said hydrosol and form in situ complex functional microgel, wherein all particulate matter present in the system becomes flocculated instantaneously, indiscriminately and completely to form a structural aggregate pigment product; and (c) optionally, dewatering the system from step (b), e.g., by filtration, centrifugation, drying, or combination thereof, and pulverizing the resultant filter cake to obtain a structural aggregate pigment product with the desired particle-size distribution.

It is important to emphasize strongly the optional character of the finishing operations in step (c), such as filtration, drying and pulverization, in that the flocculated product from step (b) can be used directly "as is," for example, as a filler for paper making. In a similar fashion, the flocculated product from step (b) may be filtered and rinsed, to remove electrolyte by-products from microgel formation, and then repulped mechanically for use in paper filling or special coating applications.

With particulate matter being the quantitatively predominant phase, the relative weight content of the in-situ formed complex functional microgels in the resultant structural aggregate single-component and multiple-component pigment products synthesized with the aid of the above method ranges merely from 0.5% to 10%, as determined by ashing.

DESCRIPTION OF THE PREFERRED EMBODIMENTS

In the preferred form of practicing the present invention, novel structural aggregate pigment products for paper filling, paper coating, and many other applications, are manufactured by synthesizing in situ complex functional microgels in aqueous dispersions of quantitatively predominant particulate matter, also containing water-soluble functional adjuvants. The principal particulate raw materials for the manufacture of structural aggregate pigments include a variety of mineral and organic pigment products of the present art, as well as ultrafine white or colorless mineral and/or organic particles with dimensions ranging from 0.01 $\mu$m to 0.1 $\mu$m e.s.d. (equivalent spherical diameter) which are too small to be classified as white pigments in the conventional sense due to low light-scattering efficacy. Upon practicing the present invention, however, these ultrafine particles become aggregated into assemblies with sufficiently large dimensions to render them optically active in a commercial sense. The above, and other, particulate raw materials for the manufacture of structural aggregate pigments mentioned shall be described in more detail hereinafter.

Structural aggregate pigments may be made from a single principal particulate species, e.g., kaolin clay. Such pigments shall be called further on "simple aggregate pigments," in differentiation to "composite pigments" which shall relate to structural aggregate pigments made from two or more different principal particulate mineral species.

The primary purpose of the in-situ formed complex microgels is to induce instantaneous (ultrarapid), indiscriminate and complete flocculation of all disperse phases present in the reaction medium. Flocculation phenomena play fundamental and indispensable roles in the manufacture of all structural aggregate pigments. The flocculation processes of the present art, however, are slow, selective (rather than indiscriminate), and incomplete. As a consequence, these processes are not well suited for the manufacture of even simple structural aggregate pigment products free of significant performance deficiencies, and are even less suited for the manufacture of more exotic composite aggregate pigments assembled from physically, chemically and colloidally highly differentiated particulate components.

Particulate raw materials for the manufacture of such exotic composite pigments encompass, for example, various naturally occurring and synthetic minerals with particle sizes ranging from 0.01 $\mu$m to 10 $\mu$m e.s.d., non-film-forming (high glass-transition temperature) organic emulsion polymers with particle diameters ranging from 0.03 $\mu$m to 1 $\mu$m, latex adhesives with particle diameters ranging from 0.07 $\mu$m to 0.3 $\mu$m, and color pigments with particle diameters even smaller than 0.01 $\mu$m. The enormous quantitative and qualitative heterogeneity of above furnishes are realized best when considering that the linear dimensions of individual particles span over 3 orders of magnitude, hence, the corresponding volumes or weights of these particles may differ by a factor of one billion! Moreover, the relative densities of particulate matter may vary from about 1 g/cm$^3$ for certain plastics to 4.2 g/cm$^3$ for titanium dioxide pigments, while the surface-chemical properties of particulates may range from very hydrophilic to extremely hydrophobic.

It is not surprising, therefore, that the detrimental separation and selective fractionation of qualitatively and quantitatively highly differentiated particulate matter used for synthesis of composite pigments can not be prevented with the aid of slow, incomplete, and selective flocculation processes and inefficient flocculating agents of the present art. As a matter of fact, many ultrafine water-based colloidal systems can not be flocculated (precipitated) at all with the use of means known in the present art. In the Applicant's own diversified experimentation, on the other hand, no water-based colloidal system has yet been encountered, regardless how complex or difficult, able to resist the overpowering instantaneous, indiscriminate, and complete, flocculating action of the in-situ formed complex functional microgels used in practicing the present invention.

The secondary purpose of the complex microgels disclosed herein is to provide an arbitrary level of intrinsic cementation to aggregated pigment particles upon subsequent drying, or other finishing operations. The desired level of cementation can be attained by varying composition and/or dosage of the functional complex microgels, such as to provide structural aggregate pigment products with sufficient mechanical integrity to withstand the customary shearing (loading) and/or comminution regimes to which they may be exposed in practical handling and end-use operations.

It should be pointed out in this context that the adhesive action of above microgels is possible only due to the extremely small particle size, enabling the microgel particles to orient themselves effectively as discrete ultrathin formations at the interfaces between adjacent pigment particles to be cemented. Although particles of above microgels are obviously larger than those of silico-aluminate, silico-zincate, or silico-aluminate-zincate hydrosols from which they were derived through crosslinking (polycondensation) with bivalent or multivalent inorganic salts and/or organic cationically-active chemical compounds with two or more reactive groups in each molecule, they could not be detected visually under 50,000$\times$magnification in electronphotomicrographs of dried and pulverized composite pigments prepared with the aid of these microgels. Spheroidal hydrosol particles with diameters ranging from 10 nm to 50 nm described in U.S. Pat. No. 2,974,108 to Alexander, on the other hand, can be seen clearly in similar electronphotomicrographs.

It is apparent that solid inorganic particles of the latter size, i.e., 10 nm to 50 nm, would not only be useless as interfacial cements or adhesives, but would actually interfere physically with the formation of adhesive joints between adjacent microparticulates. In-situ precipitated solid mineral particles of similar or larger dimensions have been found useful, however, in synthesizing certain kinds of composite pigments, for example, of coprecipitated/coaggregated type disclosed in U.S. Pat. No. 4,026,721 to Kurrle. According to this patent, solid spherical hydrous metal-silicate particles were precipitated on the surface of kaolin clay platelets improving the end product's optical performance.

The tertiary purpose of the complex microgels disclosed herein is to impart directly, by virtue of their inherent physical and surface-chemical properties, certain specific material and functional properties to the aggregated and cemented products, important from the standpoint of these products' end-use applications. The above effects can be realized through purposeful modification of the chemical composition, and/or physical properties, of the complex functional microgels. For example, surface-chemical modification providing enhanced compatibility with organic media may be attained by intrinsic incorporation of suitable organic polyelectrolytes, and/or other specialized agents, into macromolecules which make up the complex microgels of the present invention. Composite pigments synthesized with the aid of such microgels with built-in organic groups (functionalities) are especially well suited as fillers for plastics, since they can be easily and uniformly dispersed in oleophilic media.

Anionic polyelectrolytes with microgel-modifying functions, encompassing, among other things, sodium salts of polyacrylic acid or carboxymethyl cellulose, may be introduced into the system through the anionic stream, e.g., along with sodium silicate or sodium aluminate, or added directly to the particulate dispersion. Cationic modifying agents encompassing, among other things, selected bivalent or multivalent inorganic salts, as well as organic cationically-active compounds with at least two reactive groups in each molecule, may be introduced into the system along with the solution of the principal bivalent or multivalent inorganic salt(s) used for microgel formation.

The indirect system-modifying action of complex microgels, made possible by the indiscriminate and complete flocculating and retention of such powerful surface-chemical modifiers in their own right as organic dyes and polymer-emulsion adhesives, is also important. Other examples of functional modification of inherent properties, or functional characteristics, of structural aggregate pigments through the in-situ precipitated complex microgels used in practicing the present invention shall be discussed hereinafter.

The principal reagents of commercial significance for the in-situ synthesis of the complex functional microgels under discussion are: (1) alkali-metal silicates and quaternary ammonium silicates, preferably sodium silicate; (2) alkali-metal aluminates, alkali-metal zincates, and blends thereof in any proportions, preferably sodium aluminate; and (3) water-soluble, essentially colorless, bivalent and multi-valent inorganic salts, preferably calcium chloride and calcium nitrate but equally well other similar salts of calcium, magnesium, barium, aluminum, zinc and zirconium, as well as cationically-active organic compounds with at least two reactive groups in each molecule, capable of performing the same gel-setting functions as bivalent or multivalent inorganic salts. Of course, both anionic and cationic organic additives used in the process must be compatible with their respective anionic and cationic reaction streams, as indicated by absence of phase separation, clouding, or premature gelling.

From a chemical standpoint the above complex microgels are made up of macromolecules of hybrid polymer-polycondensate type, the polymerization reaction being at the foundations of hydrosol formation while polycondensation takes place during crosslinking of the reactive hydrosols by cationic gel-setting agents. Inorganic/organic hetero-macromolecules of the same polymer-polycondensate type are formed when organic chemical compounds with at least two reactive groups in each molecule are built intrinsically into the microgel structure.

Since the primarily auxiliary functions of the complex microgels are limited to flocculation, cementation and surface-chemical modification of disperse particulates, these gels are used as a rule at the smallest possible dosages needed to perform the intended tasks, ranging from 0.5% to 10%, by weight, as determined by ashing, of the total mass of aggregate pigments, the particulate matter being quantitatively predominant phase in the overall material balance. On the basis of extensive experimentation with various simple, as well as most intricate composite, structural aggregate pigment formulations, it has been established that the relative weight content of complex microgels in a vast majority of end products, determined by ashing after washing out electrolyte by-products such as NaCl, NaNO$_3$, or Na$_2$SO$_4$, needs to approach 6% to 10% in only most demanding cases, e.g., those involving high levels of addition of organic particulates, dyes, and the like. In majority of practical applications, however, the relative weight content of complex functional microgels in structural aggregate pigment products ranging from 1% to 6%, as determined by ashing, will be sufficient for adequate handling and end-use performance. In some less demanding applications, e.g., those which do not involve filtration and subsequent dewatering and comminution of the flocculated medium, a relative weight content of complex functional microgels in the resultant pigment products as low as 0.5 %, as determined by ashing, is adequate.

It should be emphasized that formation of intermediate hydrosols, and final microgels, used in practicing the present invention are not stoichiometric. The same hydrosols and/or microgels are synthesized each time, however, when the reagent concentrations and proportions, as well as reaction conditions during synthesis of these hydrosols and/or microgels, are the same. On the other hand, the principal qualitative and quantitative compositions of above hydrosols and microgels may be varied within unusually broad ranges without detriment to these hydrosols', or microgels', intended functional performance. For example, the ratio of sodium silicate to sodium aluminate, sodium silicate to sodium zincate, or sodium silicate to the combined mass of sodium aluminate and sodium zincate in forming the subcolloidal reactive hydrosols (sodium-silico-aluminate, sodium-silico-zincate, and sodium-silico-aluminate-zincate, respectively) may range from 10:1 to 1:10, by weight, the preferred ratio for most applications pertaining to the synthesis of structural aggregate pigments being 1:1. The concentration of sodium silicate in aqueous slurries of particulate matter should vary optimally from 0.1% to 2%, by weight, the same pertaining also to sodium aluminate, sodium zincate, or combination thereof. Reagent concentrations significantly higher than 2%, by weight, would lead in a short period of time to formation of high-molecular-weight hydrosols with reduced reactivity relative to crosslinking agents, necessitating a drastic increase of throughput rates of the reaction medium through the reactors.

As far as the formation of complex microgels is concerned, a simple 1:1 ratio, by weight, of calcium chloride or equivalent crosslinking salts to the combined hydrosol mass is adequate for a well balanced performance encompassing both flocculation and subsequent cementation of particulate matter used for synthesis of structural aggregate pigments of the present invention. It should be pointed out, however, that some excess of crosslinking ions is necessary from the standpoint of process kinetics, particularly in plant operations employing large mixers-reactors. As has been determined by chemical analysis, the concentration of calcium, or equivalent, ions in the reaction medium should exceed by at least 50% the amount of such ions actually bound chemically by the reactive hyrosols. As a matter of fact, it is sometimes advantageous to use an even higher excess of bivalent and/or multivalent inorganic salts for hydrosol crosslinking, e.g., by employing of up to 10%, by weight, of these salts on the total mass of particulate matter.

Unlike with bivalent and multivalent inorganic crosslinking salts, the ratio of organic, cationically active, crosslinking agents to hydrosol mass must be determined empirically for each individual compound and specific application. The reason for this is that the chemical properties of above organic materials are vastly more differentiated from the standpoint of their effect upon end-use properties of structural aggregate pigment products than are those of corresponding inorganic crosslinking agents. As a general rule, the relative proportion of the above organic crosslinking agents should range from 0.1% to 5% of the mass of particulate matter.

As is understood readily by those skilled in the art, the anionic and cationic streams in the process for synthesizing structural aggregate pigments of the present invention may be reversed by blending solutions of bivalent and multivalent inorganic salts and/or organic, cationically active, chemical compounds with at least two reactive groups in each molecule with aqueous dispersions of particulate matter in step (a); preparing subcolloidal reactive sodium-silico-aluminate (silico-zincate or silico-aluminate-zincate) hydrosols independently in step (b); and blending in step (c) systems resulting from steps (a) and (b) to form in situ complex functional microgels to flocculate the particulate matter instantaneously, indiscriminately and completely to synthesize structural aggregate pigment products. It should be pointed out, however, that the above reversion of process streams is feasible only in such instances in which the colloidal stability of dispersions of particulate matter is not impaired intolerably by a short period of contact with solutions of cationic agents employed.

The pH of the flocculated structural aggregate pigment products from step (c) above ranges usually from 10 to 12. In cases in which neutral, or slightly subneutral, pH is preferred, predetermined amounts of sulfuric acid, or other inorganic or organic acidifying agents, may be added to the dispersion of particulate matter in step (a). The amount of agents necessary to lower pH to the desired level must be assessed independently, by titrating a sample of the alkaline medium from step (c) with solutions of the acidifying agents to be employed. Though in principle the resultant pH of the flocculated medium in step (c) could be lowered to 3.5, the colloidal stability of most dispersions of particulate matter used for synthesis of structural aggregate pigments of the present invention will be impaired intolerably below pH of 5, or even 5.5.

The complex functional microgels used in practicing the present invention may also be prepared independently, in plain water, and then blended with a dispersion of particulate matter to flocculate the latter indiscriminately and completely, but not instantaneously, to form a structural aggregate pigment product. It should be emphasized, however, that the process version in which subcolloidal reactive hydrosols are synthesized first in aqueous dispersions of particulate matter, followed by addition of cationic crosslinking agents, is preferred for the synthesis of structural aggregate pigments according to the present invention.

The above, almost boundless, latitude with respect to chemical composition of complex microgels used in practicing the present invention is very unique, in that practically all methods of gel synthesis known in the present art rely on very strictly and narrowly defined compositions, both with regard to these gels' synthesis as well as end-use properties.

Another uniquely broad latitude with regard to the reaction conditions in general pertains to the pH range, extending from 3.5 to more than 12, under which the complex microgels of the present invention can both be synthesized and perform their intended functions.

As is typical of ultrafast reactions in aqueous media, the in-situ formation of the complex functional microgels mentioned is virtually independent from temperature. This means that, in principle, the above microgels could be formed within the entire temperature interval in which water remains fluid, i.e., from above the freezing point to below the boiling point. From a purely practical standpoint, however, the temperature at which composite pigments can be manufactured will be determined primarily by the thermal stability of dispersions of particulate raw materials.

The virtual independence from thermal conditions and regimes is a very unusual and unique feature of above microgels, which becomes readily apparent when comparisons are made with other technologies of gel formation in accordance with the present art. For example, countless patents pertaining to the manufacture of catalysts, ion exchangers, pharmaceutical preparations and other products based on in-situ formed gels, sometimes of virtually identical compositions, frequently differ only with respect to small variations of the thermal regimes.

The broad latitudes with respect to reaction conditions, mentioned above, constitute a clear indication of the incredible overriding power of the principal colloidal-chemical system used in practicing the present invention. It is worth noting that similar latitudes are intolerable with procedures of the present art, according to which continuous gels and hydrosols, and products made with their use, must be manufactured always under very strictly defined reagent concentrations and proportions, pH conditions, as well as thermal and procedural regimes.

The potential role of structural aggregate pigments of the present invention in future paper making technologies can be perhaps illustrated best against a background of present industrial practices relying on the use of conventional mineral pigments. For use in paper making, the latter pigments are made down as a rule in the form of concentrated, optimally dispersed slurries. In their final destination, on the other hand, these pigments exist in a highly aggregated and/or flocculated state, e.g., encased within a paper-coating matrix or filled paper webs. This terminal aggregation/flocculation is particularly strongly pronounced in coatings, especially those made with the aid of highly poly-disperse and anisometric kaolin pigments characterized by very fine particle size.

The latter pigments are typified by No. 1 V.F. (Number One Very Fine), high-glossing, hydrous coating clays which contain 95%–100%, by weight, of particles smaller than 2 $\mu$m e.s.d. (equivalent spherical diameter), less than 10%, by weight, of particles smaller than 0.1 $\mu$m e.s.d., and have an average particle size ranging from 0.2 $\mu$m to 0.4 $\mu$m e.s.d. Briefly, the above clay products may be described as being manufactured from inherently very fine particle size crudes by blunging the latter in water, removing particulate impurities larger than 44 $\mu$m e.s.d. with the aid of appropriate screens, followed by centrifugation to obtain a useful fraction with particles 95% to 98%, by weight, finer than 2 $\mu$m e.s.d. The latter fraction is subsequently beneficiated by physical methods such as high-gradient magnetic separation, colloidal-chemical methods such as flotation and selective flocculation, and chemical methods such as oxidation and reduction bleaching important also from the standpoint of chemical stabilization of the end product.

The above very fine particle size clays are used by themselves almost exclusively for the manufacture of glossy printing papers, representing a relatively small market, and as feedstock for making fine particle size calcined clay pigments. In the state "as is," these clays are practically unusable toward paper filling applications due to poor retention on the paper machine, inferior optical efficacy, and strong fiber debonding action.

At the present, very fine particle size clays are used mainly as diluents for regular coating clays derived from substantially more valuable, coarser, more crystalline "white" clay crudes. The light-scattering coefficients of clay pigments made 100% from the latter crudes ar about two to three times higher than those of very fine particle size, high-glossing clays. Unfortunately, white crudes, particularly those having good rheological properties, are progressively more scarce. As a consequence, admixing of up to 50% of optically inferior very fine particle size clays into commercial coating clay products has become a virtual necessity throughout the clay industry. It is not surprising, therefore, that the optical properties of such hybrid coating clays constituting the bulk of present market sales deteriorate progressively as the deposits of better crudes become depleted. Indeed, the light-scattering coefficients of clay products marketed some 15 years ago were an the average 40% to 50% higher than those of analogous products marketed today, the foregone conclusion being that the situation will only get worse in the future.

The limited usefulness of very fine kaolin clay crudes is most unfortunate in that the vast majority of clay deposits in the United States belong to this category. Moreover, there are no realistic prospects for a broader utilization of such clays within the context of pigment manufacturing, or other commercial applications, relying on technologies of the present art. Hence, the technology of the present invention utilizing these abundant very fine particle size, low-value, crudes as a most valuable raw material toward the manufacture of high-performance, high-value added, structural aggregate pigments constitutes de facto a major breakthrough in the utilization of otherwise inferior, or even useless, raw materials.

It is known from optical physics that the highest intensity of light scattering by a spherical particle is attained when the diameter of the particle is equivalent to one-half of the wavelength of impinging light, i.e., approximately 200 nm to 300 nm. With platy clay particles, the light is scattered by various solid irregularities, such as particle edges or corners, or surface protrusions. Under practical end-use conditions encountered in paper filling and coating, with the individual pigment particles being compacted (by way of flocculation and aggregation) into integral formations existing within filled webs or paper-coating matrices, the light is scattered both by internal as well as external structural (solid) details of these formations. The closer are the dimensions of these structural details to those needed for optimum light scattering, the better is the resultant optical performance of the entire formation.

It becomes apparent, therefore, that a method enabling one to effectively control the process of forming optimized aggregate pigment structures represents an enormous commercial potential. As demonstrated by Kaliski in the article entitled "Performance of Some Commercial Clays in Starch-Containing Paper Coating Films"—Part 1, appearing in The Journal of the Technical Association of the Pulp and Paper Industry (TAPPI) Vol. 53, No. 11, page 2077 (1970), the light-scattering coefficients of coating formations consisting of kaolin clay pigments and starch adhesives initially increase, and after passing through a maximum decrease, with increasing levels of the adhesive. The explanation of this phenomenon given by Kaliski is that undersized pigment particles, which are incapable of efficient light scattering individually, become progressively aggregated by incremental additions of the adhesive into formations whose structural details are dimensionally closer to those needed for optimum light scattering. After certain critical level of the adhesive in the coating is exceeded, however, the progressive coarsening of structural details of the resultant coating formation by additional adhesive increments becomes excessive, thus reducing the overall light-scattering efficacy of the system. This progressive intrinsic coarsening of the internal structural details with increasing adhesive levels, was demonstrated clearly with the aid of the "rho" factor developed by Kaliski and described in the above-mentioned TAPPI article.

The aggregation and flocculation processes occurring in paper filling and coating are not amenable to effective controls within the scope of technologies of the present art, though attempts to develop such controls have been reported in the literature for more than five decades. The most attractive of these approaches were directed towards development of so-called bulking pigments intended to at least duplicate the optical performance of old-fashioned satin white pigments, without the latters' numerous undesirable features. From the standpoint of optical performance and printability, satin white admixed to conventional coating clays has indeed a unique ability to induce favorable intrinsic structures in the resultant coating formations. The preparation, handling and application of coating colors containing satin white, however, are rather cumbersome and difficult.

New concepts relating to the improvement of pigment performance in paper coatings were developed by Kaliski and described in the article entitled "Performance of Some Commercial Clays in Starch-Containing Paper-Coating Films"—Part 2 appearing in TAPPI, Vol. 55, No. 1, page 102 (1972), as well as in Chapter 13 of "Physical Chemistry of Pigments in Paper Coating" (copyright 1977 by TAPPI) in which he pointed out the importance of "early setting of transient coating structures in freshly applied coating films." Such early setting arrests progressive deterioration of the initial, statistically uniform, transient coating structures in wet coating films and eliminates the detrimental separation and selective fractionation of individual coating ingredients.

Hereinafter shall be demonstrated how structural aggregate pigments of the present invention, as well as scientific concepts discussed above, can be used to obtain many practical results superior to those attainable with the aid of filling and coating pigments of the present art.

The in-situ formed complex functional microgels mentioned above make possible to synthesize new types of structural aggregate pigment products uniquely suited toward paper coating and filling applications, filling of plastics, and many other practical uses. The optical performance of such structural aggregate pigments synthesized from a variety of commercial pigment products and other mineral and organic particulates, as well as soluble components, is substantially better than that of the original raw materials used in non-aggregated form. Many unique performance properties, as well as structural and surface-chemical features, can be imparted to these aggregate pigments almost at will by purposeful a-priori design. One of such unique performance properties is, for example, ultra-high bulking which brings about spectacularly rapid setting of coating films on paper surface. The above setting is fully independent of dewatering, such as is normally indispensable to setting of wet films containing standard coating pigments or conventional bulking pigments. By contrast, coating formations containing ultrahigh bulking pigments of the present invention become immobilized (set) rapidly without dewatering, yielding smoother and more uniform coatings with higher gloss, brightness and opacity, as well as better glueability and printability, than analogous coating formations containing pigments of the present art.

Special types of structural aggregate pigments equipped purposely with maximum bulking properties (very high level of thixotropy) are extremely valuable in paper filling applications. A complete, but totally reversible, gelling can be obtained with aqueous slurries of such specialized pigments even upon dilution to 20% solids, or even lower. Accordingly, these pigments begin to display structure-forming (bulking) tendencies during web consolidation on the paper machine even before water drainage on the forming wire is completed. The practical effects of this heretofore unknown ultrahigh bulking are manifested in substantially increased levels of filler retention, vastly improved uniformity of spatial distribution of pigment particles within consolidating paper webs, and drastic reduction of the normally difficult-to-avoid detrimental web two-sidedness.

Surface-chemical modification of structural aggregate pigments of the present invention can be affected by building in organic groups into macromolecules making up the microgels and through incorporation of organic particulates into the aggregate pigment structure, thus imparting controlled levels of affinity toward organic (non-polar) media in addition to the inherent affinity of (polar) mineral pigments toward water. In the above manner, the structural aggregate pigments acquire intrinsic dual-matrix surface characteristics of hydrophilic/organophilic type well suited, for example, toward uniform and efficient dissipation both of water and ink solvents in offset printing.

There are hundreds of anionic and cationic organic polymers in daily use by the paper and pigment industries identified only by trade names, molecular weights, and ionic type, which can be employed toward microgel formation if they are compatible with the respective ionic streams. For example, anionic polymers such as sodium salts of polyacrylic acid or carboxymethyl-cellulose are compatible with the anionic process stream if they are not coagulated, or salted out, by strongly alkaline solutions of sodium silicate, aluminate or zincate. Similarly, cationic polymers, e.g., polyacrylamides, are compatible with the cationic stream if they are not coagulated, or salted out, by solutions of bivalent and mutivalent inorganic salts. A vast number of organic monomolecular anionic and cationic chemical compounds with two or more reactive groups in each molecule can be used in addition to, or instead of, organic ionic polymers mentioned above. Examples of such anionic compounds are sodium salts of N-(1,2-dicarboxyethyl)-N-alkyl sulpho-succinamate (Aerosol 22), or ethylenediamine tetraacetic acid, while methyldodecylbenzyltrimethyl ammonium chloride-methyldodecylxylene bis(trimethyl) ammonium chloride (Hyamin 2389) is representative of organic cationic compounds with two reactive groups in each molecule. Depending on the intended end-use applications of structural aggregate pigments synthesized with the aid of polymeric o monomeric organic adjuvants, addition levels of the latter may vary from 0.1% to 5%, on the total mass of mineral particulates. Lower addition levels of these agents may suffice, for example, with structural aggregate pigments intended for coating of paper for offset printing, higher levels of addition being preferred with composite pigments intended for filling of plastics, or paper substrates to be saturated with solutions of organic resins. Of course, organic particulates, e.g., polystyrene pigments or polymer-emulsion adhesives, incorporated into the aggregate pigment structure modify the surface chemistry of the resultant pigments in an indirect fashion by forming a dual matrix of polar/non-polar type.

Carbon black and organic color dyes can be incorporated into structural aggregate pigments at levels ranging from 0.001% to 0.25% and 0.001% to 5%, by weight, respectively. Although both above materials have notoriously poor affinity toward polar surfaces, such as mineral pigments or cellulosic fibers, they are retained and distributed uniformly within aggregate structures of pigments made with the aid of in-situ synthesized complex functional microgels used in practicing the present invention.

Very low levels of addition of carbon black and/or organic color dyes, e.g., ranging from 0.001% to 0.01%, by weight, are often sufficient to correct the inherent "yellowness" typical of virtually all mineral raw materials used for synthesis of structural aggregate pigments. Somewhat higher levels of addition, e.g., ranging from 0.1% to 0.3%, by weight, for color dyes, and from 0.005% to 0.12%, by weight, for carbon black, yield highly opacifying structural aggregate filler pigments which can also be used to mask the inherent yellowness of groundwood papers. A similar level of dye addition, i.e., 0.1% to 0.3%, by weight, eventually in combination with up to 0.03%, by weight, of carbon black, will mask the pronounced yellowness of unbeneficiated kaolin clay making possible to use the latter as is, or after only inexpensive magnetic beneficiation, toward the manufacture of economical structural aggregate pigments for paper filling and coating.

Still higher levels of color-dye addition, e.g., of up to 5%, by weight, make possible to synthesize intensively colored aggregate filler pigments for the manufacture of most uniformly colored papers devoid of objectionable two-sidedness, such as is common with color papers of the present art. The above approach relies on easily controllable mechanical retention of colored filler particles in the web, eliminating the need for difficult-to-control quantitative and qualitative balancing of loose dyes in recirculating furnishes on the paper machine. The outstanding economy of the above approach should also be pointed out in that retention of mineral fillers in the sheet is from 10 to 40 times higher than that of loose, incomparably more expensive, dyes.

Decorative gray papers, totally opaque for all practical purposes, can be manufactured with the aid of structural aggregate filler pigments containing up to 0.25%, by weight, of carbon black. Very attractive, "metallised" appearance of paper surface can be obtained by incorporation both of metallic and color pigments into structural aggregate filler pigments.

It should be borne in mind also that most organic dyes and carbon black, particularly the latter, are pronouncedly hydrophobic while the in-situ formed complex functional microgels of the present invention are very hydrophilic unless cured above 220° C. In the course of the manufacturing process structural aggregate pigments are exposed to drying temperatures which rarely exceed 150° C., hence, the microgel cement retains a high degree of hydrophilicity not conducive to a total immobilization of hydrophobic dyes or carbon black. Since even traces of above colorants dispersed or dissolved in water can be noted readily at concentrations as low as one part per billion, the need for complete (100%) permanent attachment of these agents to the surface of structural aggregate pigments is rather obvious. Such irreversible attachment (immobilization) can be obtained by incorporation of suitable latex adhesives, along with organic dyes and carbon black, into the structural aggregate pigments. The most effective immobilizing agents for carbon black and organic dyes were found to be the novel ultrafine polymer-emulsion adhesives to be discussed in more detail hereinafter. In the absence of immobilizing adhesives, traces of carbon black and organic dyes detach from the mineral (polar) surface when concentrated slurries of structural aggregate pigments are exposed to intensive shearing, becoming noticeable especially after subsequent dilution and aging of the slurries.

Broadly diversified functional properties were imparted to structural aggregate pigments of the present invention by incorporation of the above-mentioned novel polymer-emulsion adhesives developed by the Applicant and disclosed in co-pending patent application (Ser. No. 07/333,435 ; Filed Apr. 4, 1989). These adhesives, encompassing acrylic, vinylacetate and styrenebutadiene polymers and copolymers, have ultrafine particles with diameters ranging from 20 nm to 55 nm, and glass-transition temperatures ranging from $+20°$ C. to $-60°$ C. Coated papers for offset printing made with the aid of structural aggregate pigments containing from 0.25% to 5%, by weight, of the ultrafine polymer-emulsion adhesives were found to have better dry and wet coating pick, as well as higher blistering resistance, than analogous coatings made with the aid of conventional pigments. Further Furthermore, structural aggregate filler pigments containing these adhesives cause much less fiber debonding than conventional fillers, this positive effect being amplified by hot calendering of the filled paper.

The above ultrafine polymer-emulsion adhesives, along with relatively fine particle size (essentially 100% finer than 5 um e.s.d.), high specific surface area (at least 50 $m^2/g$), strongly gelling minerals such as montmorillonite and bentonite, are the primary functional constituents of ultrahigh bulking pigments mentioned previously. The latter pigments are uniquely suited as fillers for uncoated printing papers, particularly newsprint and papers for ink-jet printers, as well as size-press coating pigments, because of spectacular ink holdout resulting in excellent print gloss. Furthermore, these pigments are ideal carriers for ink-curing promoters (driers), such as manganese, cobalt, or lead naphthenates, which should be incorporated into these pigments in proportions ranging from 0.1% to 5%, by weight.

Calcium-silico-aluminate, and other related, microgels used in practicing the present invention exert by themselves a pronounced surface-chemical activity. For example, cellulosic webs filled with structural aggregate pigments made with the aid of above microgels are virtually immune to aging phenomena related to intrinsic acidity and light exposure.

The instantaneous, indiscriminate and complete flocculating action of the complex functional microgels of the present invention makes possible to synthesize multiple-component structural aggregate pigments of virtually any arbitrary morphology and chemical composition, with all particulate ingredients being statistically and spatially uniformly distributed within the resultant aggregate structures, not attainable with the aid of technologies of the present art. The selection of raw materials suitable for the manufacture of structural aggregate pigments is extremely broad, encompassing, for example, virtually all types of conventional "hydrous" kaolin clay products, as well as fine particle size calcined clay pigments derived from very fine particle size kaolin clay feeds; precipitated calcium carbonate, calcium silicate, calcium aluminate, calcium sulfate, hydrated alumina, hydrated silica, and silico-aluminates, with equivalent spherical diameter ranging from 0.01 $\mu$m to 10 $\mu$m; naturally occurring calcium carbonate, gypsum, talcum, montmorillonite, and bentonite, with equivalent spherical diameter ranging from 0.1 $\mu$m to 5 $\mu$m; conventional (commercially available) titanium dioxide pigments, as well as titanium dioxide products obtained by special intensive comminution of commercial materials to increase substantially the relative proportion of particles with diameters between 0.2 $\mu$m and 0.4 $\mu$m, and reduce the largest particles to a diameter essentially smaller than 0.9 $\mu$m, but preferably finer than 0.7 $\mu$m or even 0.6 $\mu$m; naturally occurring rutile and anatase minerals comminuted intensively to an average particle size essentially finer than 1 $\mu$m; organic polymeric pigments; synthetic and natural (cellulosic) microfibrils; conventional latexes as well as novel ultrafine polymer-emulsion adhesives; ink-curing promoters; color dyes and carbon black; and particulate phenolic resins of the type used in the manufacture of carbonless paper.

Interesting steric effects of practical significance can be obtained if a proportion of particulate mineral raw materials for the manufacture of structural aggregate pigments are very fine, or even ultrafine (i.e., 0.01 $\mu$m to 0.1 $\mu$m e.s.d.). For example, with composite pigments consisting of 30% conventional titanium dioxide pigment and 70% ultrafine precipitated calcium silicate, by weight, each individual particle of titanium dioxide immobilized in the resultant aggregate structure may be surrounded by up to 20,000, or even 30,000, particles of calcium silicate. The net effects of such unique steric configurations are manifested by vastly increased light-scattering efficacy of titanium dioxide particles independent of crowding conditions in a filled sheet, or a coating, excellent first-pass retention on the paper machine, highly increased oil absorption, and other important performance advantages.

The use of functional complex microgels of the present invention toward manufacture of structural aggregate pigments with vastly improved optical and other performance properties shall be illustrated hereinafter by way of laboratory examples. The following Example I demonstrates the preparation of a simple structural aggregate pigment from a very fine particle size centrifugal fraction (100% finer than 2 $\mu$m e.s.d.) of a low-quality Georgia clay crude, using specially developed laboratory batch process intended to simulate continuous synthesis process to be used preferably in large-scale plant operations.

EXAMPLE I

A 100 g batch of the above-mentioned very fine particle size kaolin clay fraction was made down into a slurry of about 70% solids, by weight. The batch of concentrated slurry was diluted subsequently to about 20% solids, by weight, and divided into two equal portions. A 5%-solids solution containing 2 g (dry basis) of sodium silicate was added under agitation into one portion of above clay slurry. Similarly, a 5%-solids solution containing 2 g (dry basis) of sodium aluminate was added into the second portion of the above slurry.

In the subsequent step both above portions of clay slurry were recombined rapidly under vigorous agitation, whereby a subcolloidal reactive sodium-silico-aluminate hydrosol (anionic polyelectrolyte) was formed instantly by the interaction between sodium silicate and sodium aluminate.

Immediately afterwards, a 5%-solids solution containing 4 g (dry basis) of calcium chloride was added, under very strong agitation, into the recombined clay slurry containing the above-mentioned hydrosol. Instantaneous flocculation of the slurry manifested by a total disappearance of vortex in the agitated medium was observed upon the introduction of the very first portion of calcium chloride solution into the system. It thus was necessary to increase the agitation rate promptly and steadily to restore the vortex without which a useful distribution of the remaining portion of calcium chloride solution (the whole process of addition lasting from start to end about 2 seconds) would not be possible.

The instantaneous flocculation of the system could be recognized immediately by immersing a spatula in the slurry, with the pigment flocs being clearly visible in the thin layer of liquid retained on the spatula. A narrow layer of clear supernatant above the bulk of flocculated slurry formed after a couple of minutes, while a thick crystal-clear layer of supernatant was observed after a couple of hours.

The flocculated slurry could be filtered right away, though a controlled period of aging enhances the filtration rate almost invariably with all flocculated particulate systems. Dewatering of the above slurry on a Buechner funnel at filter-cloth loading of 2000 g/m$^2$ was extremely fast. As a matter of fact, 20%-solids slurry of above pigment having pH of 12 needed under above conditions about 30 minutes for complete filtration and rinsing as compared to 30 hours for a 20% solids slurry of non-aggregated raw material flocced with sulfuric acid to pH of 2.5. It is worth noting that filtration of alkaline slurry of a very fine particle size kaolin clay pigment would be totally impractical.

To obtain the final product (simple structural aggregate pigment), the rinsed and dried filter cake was pre-crushed and comminuted with the aid of conventional pulverizing equipment used routinely in the clay industry. The comminution regime, defined by the number of passes through the pulverizer and the size of screen openings, was chosen so as to maintain the dimensions of largest particles in the resultant pigment product only slightly larger than they were in the raw material employed, limiting the permanent aggregation effectively to the finer particulate fractions present in the starting material.

The optical performance of the structural aggregate pigment product obtained was rather impressive. The light-scattering coefficients of binderless coating films on black glass plates, determined with the aid of techniques described by Kaliski in TAPPI 53(11)1970, were 0.170 m$^2$/g for the aggregate pigment as compared with 0.050 m$^2$/g for the starting material (very fine particle size kaolin clay).

Similar results were obtained when sodium aluminate in the reactive hydrosol was replaced partially or totally with equivalent amounts of sodium zincate, or when calcium chloride was replaced with calcium nitrate.

Dosages of microgel-forming reagents employed in Example I are preferable both with simple, as well as many composite, structural aggregate pigments made according to the present invention. One can comprehend readily, however, that other reagent dosages and/or proportions will often be called for considering the virtually countless types of structural aggregate pigment products which can be synthesized by the described method for various specific uses.

It should be pointed out also that the flocculated slurry in Example I was dewatered by vacuum filtration (Buechner funnel). In plant operations, however, the vacuum filtration/rinsing combination intended to remove electrolyte by-products of microgel formation should be followed up preferably by a pressure-filtration step. Attaining highest possible filtercake solids level in the latter step is helpful in eliminating "fine-end tail" in the resultant pigment products, encompassing the optically less efficient but strongly debonding aggregates smaller than 0.2 $\mu$m, or so. It has also been established experimentally that flashdrying, in which both the drying and pulverizing operations are intrinsically combined, is advantageous in large scale manufacturing of structural aggregate pigment products of the present invention, from the standpoint of ease of dispersion, reduction of detrimental screen residue, and overall process economy.

As is readily understood by those skilled in the art, the laboratory batch manufacturing process described in Example I is applicable also to plant-scale manufacturing. As far as product quality and versatility of product design are concerned, how ever, best results are obtained with the aid of continuous manufacturing processes which provide optimum control of the critical crosslinking step and allow one to use higher concentrations of hydrosol-forming reagents in the reaction medium. One of many possible versions of continuous processes for the manufacture of structural aggregate pigments of the present invention, involving continuous passage of the reaction medium through a series of in-line mixers reactors (stations), is described below in a simplified fashion as consisting of the following processing steps:

(a) metered quantities of slurries of mineral particulates are introduced continually into first station to obtain complete homogenization of the medium at high shearing rates;

(b) metered quantities of dilution water, soluble (anionic) organic agents, polymer-emulsion adhesives, soluble and disperse dyes, and the like, are injected continually into the in-coming reaction stream and homogenized at lower shearing rates than those employed in the previous station;

(c) metered quantities of hydrosol forming reagents are injected into the reaction stream entering a third station, to form the subcolloidal reactive hydrosol; and (d) metered quantities of crosslinking agent(s) are injected into the in-coming stream of the hydrosol-containing reaction medium at a forth station under precisely controlled shearing regime, to form in situ continually and reproducibly the desired complex functional microgel, thus flocculating the reaction medium instantaneously, indiscriminately and completely to obtain a structural aggregate pigment product.

Even moderate admixtures of simple structural aggregate pigment products to conventional coating clays improve substantially the latters' optical performance, as shall be demonstrated in the following example:

EXAMPLE II

A pigment blend containing 75 pats, by weight, of commercial delaminated clay and 25 parts, by weight, of the simple structural aggregate pigment from Example I, was made down into a 55%-solids coating formulation of the type used in the manufacture of gravure papers. A styrene-butadiene latex was used as the coating adhesive in proportion of 5 parts (dry weight) per 100 parts of total pigment. Analogous control coating formulation was prepared using above delaminated clay as the sole pigment.

Both above formulations were applied separately onto a typical commercial lightweight publication paper base sheet with a basis weight of 28 lbs/3300 sq.ft., at a rate of 5 lbs/3300 sq.ft., CIS (coated one side). The coated paper was dried and supercalendered under conditions such as to impart a gloss of approximately 50% to the control sample.

It was established by means of visual inspection that paper coated with the formulation containing 25/75 blend of structural aggregate pigment and delaminated clay had better surface coverage, coating lay, and K&N ink-stain uniformity than paper coated with control formulation containing delaminated clay as the sole pigment. It was further established with the aid of instrumental measurements that gloss, brightness and opacity of paper coated with formulation containing 25% of the experimental aggregate pigment were higher by 5; 2.5; and 1.5 percentage-points, respectively, than corresponding values obtained with paper coated with the control formulation.

The make-down of aqueous slurries of structural aggregate pigments, e.g., those described in Examples I and II, differs fundamentally from that of the high-glossing, very fine particle size, clays from which they were derived. For example, most coating clay products made from Georgia crudes can be made down with the aid of phosphate and/or polyacrylate dispersants into 70%-solids slurries, characterized by a more or less pronounced dilatancy. The structural aggregate pigments mentioned require up to five-times higher levels of dispersants, yet, can be made into slurries with a maximum solids content only slightly higher than 60%. The slurries in question are highly thixotropic, flow most readily under shearing, and gel immediately when the shearing forces are removed. This unique rheological behavior can be sustained if above slurries are made down into properly formulated coating colors, or even relatively low-solids pigmented sizepress formulations, which is not possible with the coating pigments of the present art.

The practical consequences of the above unique rheological behavior are quite significant. For example, coating formulations containing shear-thinning structural aggregate pigments of the present invention can be applied at highest speeds attainable with the fastest, most advanced, coaters of the present art. Indeed, coating formulations of the above-mentioned type have been applied on a commercial coater at speeds of nearly 5000 feet per minute, the empirical indications being that the coating speed could yet be increased very considerably. Moreover, since rapid setting (immobilization) of freshly applied coating films containing above structural aggregate pigments can be obtained without dewatering, the normally unavoidable disarrangement of the initial, more uniform, coating-film structures, caused by water drainage currents and contour-following phenomena taking place during setting of wet films, is nearly totally eliminated. The important practical consequences of this rapid setting are lack of objectionable coating mottle, better fiber coverage and smoother coating surface.

A simple structural aggregate pigment similar to that prepared in Example I, but containing additionally 2 parts of the ultrafine polymer-emulsion adhesive (polybutylacrylate with an average particle size below 55 nm and glass-transition temperature of $-50°$ C.) per 100 parts of pigment, by weight, was evaluated in a paper filling experiment described in the following example:

EXAMPLE III

Handsheets with dimensions of 30 cm$\times$30 cm and basis weight of 60 g/m$^2$ were prepared with the aid of laboratory mold using furnish consisting of a 50:50 softwood/hardwood combination. The system was flocculated with alum at a rate of 20 lbs. per ton of furnish, with a high-molecular-weight polyacrylamide being used as the retention aid at a rate of 1 lb. per ton of furnish. The acidity of the system was maintained at pH of 4.5 with the aid of sulfuric acid.

A set of filled handsheets was prepared with the aid of the simple structural aggregate pigment mentioned above, further referred to as the "principal" system, an analogous control system being prepared with the aid of a delaminated clay.

The brightness of unfilled handsheets was about 86% and did not change appreciably with increasing filler levels both for the principal as well as control systems. The opacity of unfilled handsheets was 71%, increasing to 84.4% with the control system and 85.1% with the principal system at a filler-loading level of 10%, by weight. Since optical properties of filled sheets should be compared at equal sheet strength, the much stronger principal sheets had to be brought up to a filler-loading level of 16.5%, by weight, to reduce their strength to the level of the control sheets containing only 10% of delaminated clay. At the increased filler content of 16.5%, the opacity of principal sheets was 88.2%, i.e., 3.8 percentage-points higher than that possible to obtain with control sheets of acceptable strength (i.e., containing 10%, by weight, of delaminated-clay filler). The additional advantage realized with the aid of the simple structural aggregate filler mentioned was replacement of 130 lbs. of expensive chemical fibers per ton of paper product with incomparably less expensive and ecologically preferable mineral matter.

The goal of maximizing the use of mineral fillers in paper has been pursued by the paper industry for many years. The main obstacles to the above goal have been progressive deterioration of sheet strength and decay of fillers' opacifying efficacy with increasing filler loading level, as well as filler abrasiveness. There is obviously no realistic chance that the above obstacles can be overcome in foreseeable future with the aid of materials and technologies of the present art. No such limitations are connected with the use of structural aggregate pigments of the present invention, however, which offer immediately a variety of performance features and advantages going a long way towards attaining of substantial increases of filler-loading levels in paper webs above the current industrial practice. As is well known, one of the main culprits in fiber debonding are free pigment fines present abundantly in all conventional mineral filler products. These fines are eliminated effectively in structural aggregate pigments made with the use of the complex functional microgels, especially with pressure filtration used as one of the intrinsic elements of aggregate-pigment manufacturing process.

All types of structural aggregate filler pigments of the present invention have, without exception, lower fiber-debonding tendency than conventional filler pigments because of effective elimination of mineral fines. The above performance advantage can be enhanced still further with the use of the novel ultrafine polyacrylic emulsion adhesives, which are capable of exerting a distinct filler/fiber cementing action when incorporated into the structure of aggregate filler pigments. This cementing action is manifested first, however, when the adhesive content reaches at least 2% of the total mass of aggregate pigments made of very fine particle size kaolin clays. The above indicates that an intrinsic "sink capacity" of the aggregate pigments with respect to the adhesive must be exceeded for some adhesive "surplus" to become available for external use, such as formation of microscopically sized adhesive joints between aggregate pigment particles and cellulosic fibers in the surrounding paper web. With structural aggregate pigments consisting primarily of fine particle size calcined clay and/or synthetic ultrafine precipitated minerals characterized by high oil absorptivity, the intrinsic demand (sink capacity) for the above ultrafine polymer-emulsion adhesives is usually higher than 2%, by weight. As is understood readily, the latter sink-capacity inherent to high-specific-surface-area minerals, such as montmorillonite or bentonite, is considerably higher than that of any other minerals and may require adhesive levels of up to 5%, by weight, of the total mass of structural aggregate pigments. It should be noted that the filler/fiber cementing action of the ultrafine polymer-emulsion adhesives seems to be very unique and could not be duplicated thus far with the use of conventional latex adhesives.

The low fiber-debonding characteristics of structural aggregate pigments used in Example III can be used to full advantage in "high-ash" filling applications, referring to filler-loading levels in excess of 30%, by weight, due to these pigments' extremely low abrasiveness. Multiple assays carried out with the aid of Einlehner's tester have shown that the abrasiveness mentioned ranges from 0 (zero) mg to 0.5 mg, qualifying these pigments as perhaps the softest mineral fillers ever used in the paper industry. The importance of low abrasiveness can perhaps be illustrated best by the fact that fine particle size calcined clay, without question the most attractive single filler pigment of the present art from the standpoint of opacifying efficacy and overall economy, is rarely used at loading levels exceeding 4% of the total mass of paper, by weight, primarily because of the prohibitive abrasiveness.

The manufacture of high-ash papers is hampered by many other problems in addition to fiber debonding and filler abrasiveness. For example, it is necessary as a rule to preflocculate the filler system before adding it to the paper furnish, in order to obtain satisfactory first-pass retention when using high filler-loading levels in the sheet. Unfortunately, the detrimental side effects of the above-mentioned filler preflocculation are invariably overall excessive flocculation of the furnish, which causes the deterioration of sheet formation quality, as well as essentially total decay of the opacifying efficacy of the filler manifested by lack of sheet opacity increase when the filler-loading level in the sheet is increased above certain critical level.

The structural aggregate pigments of the present invention have significantly higher first-pass retention potential on the paper machine, thus eliminating the need for preflocculation in high-ash paper filling applications. Moreover, ultrahigh levels of first-pass retention, well in excess of 90%, can be attained with the aid of 0.1% to 5%, by weight, of synthetic and/or cellulosic microfibrils incorporated into structural aggregate filler pigments. Cellulosic microfibrils suitable for the above purpose can be obtained with the aid of new technology developed by the Applicant and disclosed in co-pending patent application (Ser. No.: 07/165,759; Filed: Mar. 9, 1988). The latter technology involves cascade processing of cellulosic fibers, preferably cotton and well-fibrillating cellulosic pulps, the sequential processing steps consisting of:

(a) dry or wet chopping of fibers to a length preventing hydraulic spinning in subsequent wet processing;

(b) very high consistency (30% to 40% solids, by weight) refining, preferably in the presence of sodium silicate, Congo red, and/or other inorganic and organic adjuvants enhancing fibrillization;

(c) precision finishing refining with the aid of colloidal mills; and (d) processing of the system resulting from step (c) with the aid of Gmolin homogenizer or equivalent equipment employing very-high-compression/rapid-decompression (adiabatic expansion) cycles to separate residual bundles of fibrils without further appreciable reduction of fibril length.

Fibrils up to 10 $\mu$m long, or so, can be built into the structural aggregate filler pigments to provide extra-high first pass retention on the paper machine, in addition to considerable web reinforcement badly needed in high-ash paper filling applications. It is apparent that synthetic fibrils used instead of cellulosic ones will provide extra-high first pass filler retention without contributing appreciably to web reinforcement.

Opacifying characteristic of structural aggregate pigments of the present invention differs fundamentally from that of the pigments of the present art. The opacifying efficacies of the latter pigments, including such powerful opacifiers as titanium dioxide and calcined clay, deteriorate rapidly with increasing filler loading, at any level of filler addition. The reason for above performance deterioration is progressively denser crowding of filler particles leading to avalanche-like flocculation, particularly in the presence of abundant mineral fines with dimensions below 0.2 to 0.25 $\mu$m e.s.d. By contrast, the opacifying efficacy of structural aggregate filler pigments, essentially devoid of free fines and thus not prone to excessive flocculation even in crowded high-ash paper furnishes, deteriorates much more slowly with increasing filler loading levels.

The most pronounced decay of opacifying efficacy with increasing filler-loading level has been observed with inherently very fine titanium dioxide pigments. Thus, the opacity of handsheets prepared under conditions similar to those described in Example III increased by 4.8 percentage-points above that of unfilled control sheets when the relative content of titanium dioxide in the sheet was increased from 0% to 1%, by weight, but only by 0.6 percentage-points when above relative content was increased from 9% to 10%, by weight. In graphical terms this means that a curve representing opacity of $TiO_2$-filled sheets as a function of loading level ascends initially very steeply, but then flattens rapidly, as the filler-loading level of the sheet increases. The latter is understandably the chief reason why this expensive pigment is rarely used at loading levels in excess of 2 or 3 %. By comparison, analogous curves representing the opacity of handsheets filled with structural aggregate filler pigments of the present invention as a function of filler loading level ascend initially at significantly lower rates than those obtained with titanium dioxide, but retain steeper slopes at higher filler-loading levels, particularly those exceeding considerably 10 or 15%. This slow decline of opacifying power with increasing filler-loading level combined with low fiber debonding, very low abrasiveness and high first-pass retention, make above structural aggregate pigments ideally suited for high-ash filling applications directed toward manufacture of very opaque, high-quality, paper products such as could not be manufactured heretofore with the aid of pigments and technologies of the present art.

Outstanding results with respect to optical performance have been obtained with the use of structural composite pigments synthesized from blends of fine particle size calcined clay and very fine particle size "hydrous" kaolin clays. This can be illustrated well with a single example of a composite filler pigment consisting of 25% fine particle size calcined clay and 75% very fine particle size kaolin clay, by weight, having nearly the same opacifying power as the fine particle size calcined clay used by itself. "Synergistic" effects with respect to the opacifying power of very-fine-particle-size hydrous clay/fine-particle-size calcined clay blends used for the manufacture of above composite pigments have been observed with ratios of these two materials ranging from 95:5 to 5:95, by weight. Most importantly, however, composite pigments made of blends of hydrous and calcined clays have considerably lower abrasiveness and fiber-debonding tendency than straight calcined clay, hence, may be employed at considerably higher filler-loading levels than the latter pigment by itself, especially with ultrafine polymer-emulsion adhesives being built in into aggregate structure.

It should be pointed out in this context that aggregation of fine particle size calcined clay as the sole mineral component of structural aggregate pigments is counterindicated. The reason for this is that the above fine particle size calcined clays, derived from very fine particle size kaolin clay feeds, have been exposed already to thermal aggregation during the calcining process, in which the "very fine" particles of the feed become sintered-on to larger platelets, or sintered to each other into "fine" aggregates. This is comprehended readily by considering that a typical very fine particle size calcining feed has an average particle size ranging from 0.2 $\mu$m to 0.4 $\mu$m e.s.d. and virtually no particles larger than 2 $\mu$m e.s.d., whereas typical fine particle size calcined clay product has, after the thermal aggregation, an average particles size ranging from 0.6 $\mu$m to 0.8 $\mu$m e.s.d. and contains from 2% to 12%, by weight, of particles larger than 2 $\mu$m e.s.d., and less than 10%, by weight, of particles smaller than 0.2 $\mu$m e.s.d.

Incomparably more favorable circumstances emerge when inherently very fine particle size titanium dioxide pigments become interspaced ("extended") by, and co-aggregated with, relatively much coarser fine particle size calcined clays mentioned above. Hence, composite pigments of the present invention whose mineral fraction consists of 2% to 50%, by weight, of titanium dioxide pigments with the balance provided by the above-mentioned fin particle size calcined clays, were found to have excellent optical performance in paper filling and coating applications demonstrating enormous advantages of the instantaneous, indiscriminate and complete flocculation (aggregation of fines) as well as subsequent irreversible cementation, obtained with the aid of in-situ formed complex functional microgels used in practicing the present invention.

Particularly outstanding results with respect to optical performance and economy were obtained with composite pigments consisting of 40% titanium dioxide and 60% fine particle size calcined clay, by weight. The application of this composite pigment, referred to in the following Example IV as "composite pigment (40/60)", as a full-fledged titanium-dioxide substitute in coating formulations for lightweight publication paper is ilillustrated below:

EXAMPLE IV

Two coating formulations were prepared at 60% solids having compositions shown in Table 1.

TABLE 1

| Formulation Ingredients, Parts by Weight | Control Formulation | Composite Pigment Formulation |
|---|---|---|
| Delaminated Clay | 44 | 44 |
| No. 2 Coating Clay | 44 | 44 |
| Titanium Dioxide (loose) | 12 | — |
| Composite Pigment 40/60 | — | 12 |
| Starch | 9 | 9 |

The above formulations were applied to a lightweight publication base sheet with a basis weight of 32 lb per 3300 sq.ft. using a laboratory coating machine. The coated sheets were passed four times through a laboratory supercalender at 300 pli and 140° F. The resultant data are listed in Table 2.

TABLE 2

| Sheet Properties Measured | Control Formulation | Composite Pigment Formulation |
|---|---|---|
| Coat Weight, lbs/3300 sq. ft. | 5.8 | 5.8 |
| 75° Gloss, % | 36.9 | 39.6 |
| TAPPI Opacity, % | 88.6 | 88.6 |
| Brightness, % | 74.6 | 74.7 |
| Hunter L*a*b: | | |
| L | 88.2 | 88.3 |
| *a | −0.15 | −0.15 |
| *b | 3.4 | 3.3 |

Printing properties of sheets obtained with both above formulations, such as smoothness, print gloss, optical density and ink show-through, were identical for all practical purposes duplicating the parity of optical properties tabulated above.

Example IV shows clearly that titanium dioxide pigment can be substituted on "one-for-one" basis with composite pigments of the present invention containing only a fraction of the expensive high-refractive index material. Similar one-for-one substitution of titanium dioxide with the same composite pigment has been obtained in paper filling applications in a variety of paper products.

Still better optical performance has been obtained with identically formulated composite pigment (40:60 TiO2:calcined clay) in which the commercial titanium dioxide component was first subjected to intensive comminution, e.g., with the aid of attrition grinder and zirconia balls with a diameter of approx. 1 mm. As the result of above comminution the diameter of largest particles was reduced to about 0.7 $\mu$m, bringing the dimensions of the entire pigment population closer to those needed for optimum light scattering. By contrast, titanium dioxide pigments of the present art contain from 1.5% to 2%, by weight, of particles larger than 1 μm in diameter.

It should be emphasized that, the fundamental differences in the method of synthesis itself notwithstanding, there are principal differences in the composition of matter between titanium dioxide/calcined clay composite pigments disclosed by Wildt in U.S. Pat. No. 3,726,700 and analogous pigments of the present invention. Composite pigments prepared according to Wildt were based on Engelhard's Satintones No. 1 and No. 4, which are substantially coarser and 5 to 10 times more abrasive than fine particle size calcined clays used for synthesis of analogous composite pigments according to the present invention. Unlike fine particle size calcined clays derived from very fine particle size, poorly crystallized, "gray" clay crudes, Satintone products used by Wildt, intended primarily for paint applications, are obtained by calcining of feeds derived from relatively coarse, highly crystalline, "white" clay crudes.

As it is understood readily, other high brightness extender products of appropriate particle size, e.g. synthetic precipitated minerals, can be used in addition to, or instead of, fine particle size calcined clay for synthesizing titanium dioxide-containing structural composite pigments of the above-described type. It is further advantageous to incorporate at least 2%, by weight, of precipitated calcium carbonate into all composite filler pigments intended for alkaline papermaking applications.

Esthetically very pleasing, cream-colored, ultraopaque paper has been obtained with the aid of composite filler pigments consisting of fine particle size calcined clay and naturally ocurring rutile or anatase minerals comminuted intensively to an average particle size smaller than 1 μm. Very best results were obtained, however, with composite pigments containing naturally occurring rutile or anatase comminuted to a particle size 100% finer than 0.7 μm, or even 0.6 μm, whose opacifying power was found to be 5 to 6 times higher than that of commercial white titanium dioxide pigments. Because of their extraordinary coloring power, intensively comminuted naturally occurring rutile and anatase incorporated into structural aggregate pigments become practically useful at concentrations considerably lower than 1%, by weight. For applications which require both very high levels of opacification and intensive coloring, the relative content of intensively comminuted rutile and anatase in structural composite pigments may be increased to 50%, by weight.

The highest levels of opacifying efficacy have been obtained thus far by incorporation of specially prepared dispersions of carbon black, along with suitable combinations of blue and red (violet) dyes, into the aggregate pigment structure. With many important paper products, such as newsprint, lightweight publication paper, or the groundwood-containing portion of No. 4 merchant papers, the brightness requirements range merely from 58% to 75%, whereas the brightness of most commercial fillers ranges from 85% to 99%. The superfluous sheet brightness resulting from application of fillers which are much brighter than the cellulosic fibers is now routinely toned down with the use of black dyes, such as nigrosine. The use of latter dyes provides some limited improvement of sheet opacity but often leads to objectionable hue of the end product and other technical problems, e.g., poor ink holdout resulting in excessive ink strikethrough during printing. By contrast, structural aggregate pigments containing built-in carbon black and properly balanced blue and red dye combinations provide considerably higher opacifying effects at equivalent levels of sheet brightness and, at the same time, make possible to control precisely the hue, as well as improve ink holdout, of the end product.

Elementary particle dimensions of the finest commercially available carbon black products are on the order of 9 nm, but even the best carbon black dispersions of the present art contain these elementary particles in the form of "undispersable" multi-particle aggregates. According to paper industry's common experience, aqueous dispersions of such fine carbon blacks used for opacifying purposes in combination with white pigments are from 100 to 150 times more opacifying than titanium dioxide pigments. By contrast, specially prepared dispersions of carbon black incorporated into structural aggregate pigments of the present invention are from 2000 to 5000 times more opacifying than titanium dioxide pigments. To attain above levels of opacifying efficacy, commercially available aqueous dispersions of carbon black must be de-agglomerated into elementary particles with the use of a special method developed by the Applicant, referred to in the following claims as the "masterbatch." According to this masterbatch method, an auxiliary aqueous dispersion of mineral pigment, such as hydrous or calcined clay, or precipitated silicate, is first prepared at highest possible solids attainable with the aid of "heavy-duty" industrial mixing or kneading equipment. For example, aqueous slurries of kaolin clay should be prepared at solids levels ranging from 78% to 82%, by weight, which generates excessive heat and requires jacket cooling of mixing vessels. Conventional aqueous dispersions of carbon black, such as are possible to prepare by procedures of the present art, are then incorporated under maximum shearing into the auxiliary concentrated pigment slurries mentioned to break down aggregates of elementary carbon black particles and form completely uniform pastes. Since these auxiliary slurries may become fluid upon introduction of the conventional carbon black dispersions, some additional dry pigment must be added to the system to restore its consistency to the previous level. The resultant, de-agglomerated, carbon black masterbatch is used in the preparation of structural aggregate pigments in essentially the same manner as other predispersed pigmentary raw materials.

The opacifying power of structural aggregate pigments containing carbon black de-agglomerated by the above-described masterbatch method is demonstrated in the following example:

EXAMPLE V

A set of control handsheets, designated as Sheets A-1 and A-2, filled with titanium dioxide pigment was prepared using a conventional acidic papermaking process.

A parallel set of handsheets, designated as Sheets B-1 and B-2, was filled with a composite pigment, synthesized by the procedure described in Example I, consisting of 40 parts titanium dioxide, 60 parts calcined clay, 0.12 parts carbon black (active basis), and 2 parts ultrafine polybutylacrylate emulsion adhesive. The handsheets B-1 and B-2 were prepared with the aid of the alkaline papermaking process developed by the Applicant and disclosed in co-pending patent application (Ser. No.: 07/165,759; Filed Mar. 9, 1988).

Optical data obtained with both above sets of handsheets, intended for satutation with melamine-resin solutions, are presented in Table 3.

TABLE 3

| SHEET PROPERTIES MEASURED | SHEET DESIGNATION | | | |
|---|---|---|---|---|
| | A-1 | A-2 | B-1 | B-2 |
| Basis Weight, lb/3000 sq. ft. | 54.3 | 57.0 | 54.2 | 54.8 |
| Filler Content in the sheet, percent by weight | 42.0 | 40.1 | 37.2 | 37.5 |
| Net Lbs. of Filler per 3000 sq. ft. | 22.8 | 22.9 | 20.1 | 20.6 |
| GE Brightness, % | 93.8 | 92.3 | 62.7 | 62.2 |
| HUNTER L*a*b: | | | | |
| L | 97.4 | 96.8 | 79.6 | 79.0 |
| *a | −0.3 | −0.4 | −0.3 | −0.1 |
| *b | 1.1 | 1.3 | 0.8 | 0.5 |
| TAPPI Opacity, % Before Saturation | 97.2 | 96.5 | 99.6 | 99.0 |
| TAPPI Opacity, % After Saturation | 90.9 | 89.5 | 98.5 | 98.6 |
| Opacity Reduction upon Saturation, %-point | 7.3 | 7.0 | 1.1 | 0.4 |

The differences between Sheets B-1 and B-2 and control sheets regarding opacity reduction brought about by saturation of the sheets with melamine-resin solutions are striking on the basis of numerical data alone. To appreciate fully the enormous gap between opacity of 99.6% or 99.0% for unsaturated Sheets B-1 and B-2 containing the composite filler, and opacity of 97.2% or 96.5% for corresponding control sheets A-1 and A-2, listed in Table 3, an additional demonstration will be helpful. Hence, another set of titanium-dioxide filled sheets, equivalent to the control sheets designated as A-1 and A-2 in Table 3, was prepared to assess quantitatively the spectacularly high level of difficulty in obtaining even a minute incremental opacity increase within the range of very high opacity values. Since titanium dioxide is the principal opacifier in the above, highly loaded, sheets, its concentration has been expressed directly in terms of net content in lbs. per 3000 sq. in the following Table 4.

TABLE 4

| | Basis Weight, lbs/3000 ft² | Net TiO₂ Content, lbs/3000 ft² | TAPPI Opacity, % |
|---|---|---|---|
| Sheet A: | | | |
| single | 61.1 | 31.6 | 98.38 |
| double | 122.2 | 63.2 | 99.44 |
| opacity increase: | | | (+1.06 %-pt) |
| Sheet B: | | | |
| single | 60.7 | 31.6 | 98.24 |
| double | 121.4 | 63.2 | 99.24 |
| opacity increase: | | | (+1.00 %-pt) |

As shown by data in Table 4, doubling (folding) of Sheet A with opacity of 98.38% provides an incremental opacity increase of a mere 1.06 percentage-point, analogous doubling of Sheet B with opacity of 98.24% providing similarly an incremental opacity increase of a mere 1.0 percentage-point. With a triple stack of sheets obtained by doubling Sheet A and adding a single ply of Sheet B, with a combined basis weight of 182.9 lbs/3000 sq. ft., and a net TiO₂ content of 94.8 lbs/3000 sq.ft, the incremental opacity increase was still lower, namely, 0.12 percentage point above the opacity of doubled Sheet A (to a resultant level of 99.56%), demonstrating clearly the enormous difficulties, mentioned previously, associated with gaining incremental opacity increase within the interval of high opacity values. Shown clearly by data in Table 3, on the other hand, a single sheet (A-1) with a basis weight of 54.2 lbs/3000 sq.ft., with a net content of 20.1 lbs/3000 sq.ft. of composite filler pigment consisting of only 40% titanium dioxide (amounting to 8 lbs. TiO₂ per 3000 sq. ft) had an unusually high opacity of 99.6% combined with a brightness of 62.7%, such as would be considered respectable with even high quality newsprint.

The enormous opacifying power of the type of composite pigments described in Example V makes it particularly well suited for newsprint filling applications. As is well known by those skilled in the art, the basis weight of newsprint is declining steadily from a 36 lbs/3000 sq.ft. standard prior to 1973 to 30 lbs/3000 sq.ft., and even 28 lbs/3000 sq.ft., in recent years. Extensive research work is going on worldwide to lower this basis weight still further, preferably to 26 lbs/3000 sq.ft.

The principal difficulty in reaching the latter goal is that newsprint opacity should range optimally from 92% to 95% for adequate printing results, yet such high levels of opacity are difficult to maintain systematically even with present newsprint of heavier basis weight. A significant relaxation of newsprint opacity specifications is unthinkable, however, in that this would necessitate a gigantic task of developing entirely new printing technology. The general consensus is that future, ultra-lightweight, generation of newsprint will rely on the use of the most opacifying filler systems available, at substantially higher loading levels than are employed presently. The best such filler system of the present art, both from the standpoint of opacifying power and economy, consists of 30 % titanium dioxide and 70 % calcined clay, by weight. The above system is highly abrasive and debonding, however, and almost 35 %-point brighter than present-day newsprint whose brightness ranges from 59% to 62%. Using TiO₂/calcined clay blend would thus necessitate extensive dying-back of the sheet with the aid of organic dyes which, as previously mentioned., drastically reduce news, print's ink holdout when deposited on cellulosic fibers, the detrimental esthetic side effects notwithstanding.

Realistically, however, the opacifying power of TiO₂/calcined clay blend is simply too low to compensate effectively for the reduction of basis weight with ultra-lightweight newsprint, even if used above practically acceptable filler-loading levels. It should be borne in mind, though, that many newsprint mills do not have water treatment facilities, hence, are not capable of using fillers at loading levels above 2% of the fiber mass. The problem is compounded further by the fact that newsprint inks, which are immobilized by absorption, require a certain minimum of fiber/filler bulk, i.e., minimum adequate sink capacity for containment of ink, such as may be expressed in terms of surface area and pore volume per unit of newsprint mass. In the absence of adequate sink capacity, a disastrous ink strike-through will occur.

There appears to be nothing within the scope of materials and technologies of the present art capable of dealing with the above-mentioned problems. Experimental data obtained during evaluation of structural aggregate pigments of the present invention indicate clearly, however, that a satisfactory solution to these problems can be obtained with the aid of appropriately formulated composite fillers, e.g., such whose mineral portion consists of 40% titanium dioxide and up to 25% high-specific-surface-area bentonite (montmorillonite) with fine particle size calcined clay making up the mineral balance, further containing appropriate dose of built-in cellulosic microfibrils along with up to 0.12 parts of specially de-agglomerated carbon black, and up to 5 parts of ultrafine polymer-emulsion adhesives, per 100 parts of mineral components.

While certain preferred practices and embodiments of the present invention have been set forth in the foregoing specification, it is understood readily by those skilled in the art that other variations and modifications may be employed within the scope of the claims to follow.

What is claimed is:

1. A process for the manufacture of single-component and multicomponent structural aggregate pigment products from particulate matter, said particulate matter being selected from the group consisting of naturally occurring and synthetic minerals, non film forming organic emulsion polymers, latex adhesives, and color pigments treated with complex functional microgels, comprising the steps of:
   (a) preparing, in-situ, a subcolloidal reactive hydrosol by blending aqueous solutions, one of which contains at leas one compound selected from the group consisting of alkali-metal silicates and quaternary ammonium silicates in amounts of from 0.1% to 2.0%, by weight, and the other of which contains at least one compound selected from the group consisting of alkali-metal aluminates and alkali-metal zincates in amounts of from 0.1% to 2.0% by weight, each in an aqueous dispersion of quantitatively predominant particulate matter wherein the ratio of silicate to aluminate or zincate is from 10:1 to 1:10;
   (b) blending an aqueous solution containing at least one gel-setting agent selected from the group consisting of bivalent and multivalent inorganic salts in amounts of from 0.5% to 10.0%, by weight, and organic cationically-active chemical compounds with at least two reactive groups in each molecule in amounts of from 0.1% to 5.0%, by weight, with the resultant system from step (a) to crosslink the in-situ formed subcolloidal reactive hydrosol and synthesize said complex functional microgels, wherein the particulate matter flocculates instantaneously, indiscriminately and completely to form a structural aggregate pigment product; and
   (c) recovering said structural aggregate pigment product from step (b).

2. The process according to claim 1, further comprising the step of dewatering said structural aggregate pigment product.

3. The process according to claim 2, further comprising the step of comminuting said structural aggregate pigment product.

4. The process according to claim 1, wherein the silicate is selected from the group consisting of sodium and potassium silicates and quaternary ammonium silicates, the aluminate is selected from the group consisting of sodium and potassium aluminates, and the zincate is selected from the group consisting of sodium and potassium zincates.

5. The process according to claim 1, wherein the bivalent and multivalent inorganic salts employed are selected from the group consisting of water-soluble, essentially colorless, salts of calcium, magnesium, barium, aluminum, zinc and zirconium.

6. The process according to claim 1, wherein the dispersion of particulate matter further comprises from 0.1% to 5.0%, by weight, of organic, alkali-compatible, anionic polyelectrolytes.

7. The process according to claim 1, wherein carbon black and color dyes are incorporated into the aqueous dispersion of particulate matter in step (a) together with at least one material selected from conventional polymer-emulsion (latex) adhesives.

8. The process according to claim 7, wherein the adhesive is an ultrafine polyacrylic-emulsion adhesive.

9. The process according to claim 1, wherein resultant pH of the flocculated aqueous dispersion of particulate matter, after completion of step (c), ranges from 3.5 to 12.

10. A continuous process for synthesizing structural aggregate pigments from particulate matter treated with functional complex microgels according to claim 1, comprising the steps of:
    (a) blending and homogenizing component aqueous dispersions of particulate matter;
    (b) injecting soluble adjuvants continuously into a system resulting from step (a);
    (c) continuously metering in solutions of reagents into the system resulting from step (b) to form a subcolloidal reactive hydrosol, said reagents being selected from a first group consisting of alkali-metal silicates and quaternary ammonium silicates and a second group consisting of at least one reagent selected from the group consisting of alkali-metal aluminates and alkali-metal zincates;
    (d) continuously metering in a solution of at least one gel-setting agent selected from the group consisting of bivalent and multivalent inorganic salts and organic cationically-active chemical compounds with at least two reactive groups in each molecule into the system resulting from step (c) to form a structural aggregate pigment product; and
    (e) continuously recovering said structural aggregate pigment product from step (d).

11. A process for the manufacture of single-component and multiple-component structural aggregate pigment products from particulate matter, said particulate matter being selected from the group consisting of naturally occurring and synthetic minerals, non film forming organic emulsion polymers, latex adhesives, and color pigments treated with functional complex microgels, comprising the steps of:
    (a) adding a solution of at least one gel-setting agent selected from the group consisting of bivalent and multivalent inorganic salts and organic cationically-active chemical compounds with at least two reactive groups in each molecule into an aqueous dispersion of quantitatively predominant particulate matter;
    (b) preparing a subcolloidal reactive hydrosol by blending an aqueous solution of a compound selected from the group consisting of alkali-metal silicates and quaternary ammonium silicates in amounts of from 0.1% to 2.0%, by weight, with an aqueous solution containing at least one compound selected from the group consisting of alkali-metal aluminates and alkali-metal zincates in amounts of from 0.1% to 2.0%, by weight, the ratio of silicate to aluminate or zincate being from 10:1 to 1:10 by weight,;
    (c) blending the systems resulting from steps (a) and (b) to synthesize in situ said complex microgels, wherein the particulate matter flocculates instantaneously, indiscriminately and completely to form a structural aggregate pigment product; and (d) recovering said structural aggregate pigment product from step (c).

12. The process according to claim 10, further comprising the step of dewatering said structural aggregate pigment product.

13. The process according to claim 11, further comprising the step of comminuting said structural aggregate pigment product.

14. The process according to claim 10, wherein predetermined amounts of acidifying agents are added to the aqueous dispersion of particulate matter in step (a), such as to maintain the final pH of said dispersion flocculated in step (c) at a level of from 3.5 to 12.

15. The process according to claim 10, wherein the bivalent and multivalent inorganic salts employed are selected from the group consisting of water-soluble, essentially colorless, salts of calcium, magnesium, barium, aluminum, zinc and zirconium.

16. The process according to claim 10 wherein said bivalent and multivalent inorganic salts employed are present in the reaction medium in amounts ranging from 0.5% to 10.0% of the total mass of particulate matter.

17. The process according to claim 10, wherein said organic, cationically-active, chemical compounds employed are present in the reaction medium in amounts ranging from 0.1% to 5.0% of the total mass of particulate matter.

18. The process according to claim 10, wherein said hydrosol-forming reagents employed are selected from a first group consisting of sodium, potassium and quaternary ammonium silicates and a second group consisting of sodium and potassium aluminates and sodium and potassium zincates.

19. The process according to claim 16, wherein carbon black in amounts of from 0.001% to 0.25% by weight, and color dyes in amounts of from 0.001% to 5%, by weight are incorporated into the aqueous dispersion of particulate matter in step (a) together with at least one material selected from the group consisting of conventional polymer-emulsion (latex) adhesives, in amounts of from 0.1% to 5%, by weight.

20. The process according to claim 19, wherein the adhesive is an ultrafine polyacrylic-emulsion adhesive.

21. The process according to claims 7, 8, 18 or 19, wherein the carbon black dispersion employed is de-agglomerated by the masterbatch method.

22. The process according to claim 11, wherein the resultant pH of the flocculated dispersion of particulate matter after completion of step (c) ranges from 3.5 to 12.

* * * * *

UNITED STATES PATENT AND TRADEMARK OFFICE
CERTIFICATE OF CORRECTION

PATENT NO. : 5,116,418
DATED : May 26, 1992
INVENTOR(S) : Adam F. Kaliski

It is certified that error appears in the above-indentified patent and that said Letters Patent is hereby corrected as shown below:

Column 2, line 43; delete "Fadher" insert therefor -- Fadner --.

Column 5, line 55; delete "ca" insert therefor -- can --.

Column 15, line 58; delete "o" insert therefor -- or --.

Column 20, line 26; delete "how ever" insert therefor -- however --.

Column 25, line 66; delete "fin" insert therefor -- fine --.

Column 30, line 40; delete "news, print's" insert therefor -- newsprint's --.

Column 30, Claim 1, line 24; delete "leas" insert therefor -- least --.

Columns 33 and 34, Claims 12, 14, 15, 16, 17 and 18, line 1; delete the numeral "10" insert therefor the numeral -- 11 --.

Column 34, Claim 19, line 1; delete the numeral "16" insert therefor the numeral -- 11 --.

UNITED STATES PATENT AND TRADEMARK OFFICE
CERTIFICATE OF CORRECTION

PATENT NO. : 5,116,418
DATED : May 26, 1992
INVENTOR(S) : Adam F. Kaliski

It is certified that error appears in the above-indentified patent and that said Letters Patent is hereby corrected as shown below:

Column 34, Claim 21, line 1; delete the numerals "18 or 19" insert therefor the numerals -- 19 or 20 --.

Signed and Sealed this

Twenty-third Day of November, 1993

BRUCE LEHMAN

Attest:

Attesting Officer

Commissioner of Patents and Trademarks